United States Patent [19]

Hawthorne

[11] 3,905,936

[45] Sept. 16, 1975

[54] COATING PARTICULATES

[75] Inventor: David Geoffrey Hawthorne, South Oakleigh, Australia

[73] Assignee: Commonwealth Scientific and Industrial Research Organization, Campbell, Australia

[22] Filed: Aug. 21, 1973

[21] Appl. No.: 390,222

[30] Foreign Application Priority Data

Aug. 25, 1972 Australia............................ 219/72

[52] U.S. Cl............. 260/40 R; 106/288 B; 106/290; 106/296; 106/300; 106/302; 106/304; 106/306; 106/307; 106/308 Q; 106/308 F; 106/308 N; 106/309; 117/100 B; 117/100 M; 117/100 S; 260/42.14

[51] Int. Cl.$^2$........................ C08K 9/04; C09C 3/08

[58] Field of Search................... 260/41, 40, 42.14; 106/308 Q, 309, 288 B, 290, 296, 300, 302, 304, 306, 307; 117/100 B, 100 M, 100 S

[56] References Cited
UNITED STATES PATENTS

| | | | |
|---|---|---|---|
| 2,835,685 | 5/1958 | Rinse | 260/448 R |
| 3,294,686 | 12/1966 | Ayers | 106/300 |
| 3,660,134 | 5/1972 | Morris et al. | 106/308 Q |

FOREIGN PATENTS OR APPLICATIONS

| | | | |
|---|---|---|---|
| 44-17025 | 7/1969 | Japan | 106/308 Q |

*Primary Examiner*—James H. Derrington
*Attorney, Agent, or Firm*—Bacon & Thomas

[57] ABSTRACT

Particulate inorganic or mineral materials, are surface modified by treatment with an organic aluminium derivative of the formula $(RO)_n AlR'_{3-n}$ where R is an aliphatic or aromatic hydrocarbyl radical containing 1 – 12 carbon atoms; R' is a substituted or unsubstituted, saturated or unsaturated carboxylate radical ($R''CO_2-$) or oxy radical ($R'''O-$) or a mixture of such radicals, where R'' and R''' are aliphatic, alicyclic, aromatic, aralkyl or heterocyclic radicals and R'' contains 1 to 36 carbon atoms and R''' contains 6 to 25 carbon atoms with the proviso that R''' is not identical with R; and $n$ has the value 1 or 2. The thus modified particles have a layer, chemically bonded to their surfaces, which comprises at least one oxyaluminium derivative of the carboxylate or oxy radical, in which at least one of the radicals R'' and R''' is oriented to provide a hydrobic and oleophilic surface for the particle. The products show improved dispersability in organic liquid and plastics systems and confer improved mechanical properties on plastics containing the materials as fillers.

17 Claims, No Drawings

COATING PARTICULATES

This invention relates to methods for the treatment of particulate inorganic or mineral materials, especially fillers or pigments so as to modify the surfaces of such materials. Such modified materials show advantages over unmodified materials when used as pigments or fillers in aqueous or non-aqueous media, and in a variety of synthetic polymeric products such as paints, plastics coatings and articles, elastomers and synthetic fibres.

In accordance with the present invention, particulate inorganic or mineral materials, especially fillers and pigments, are modified by treatment with organic aluminium derivatives of the formula $nAlR'_{3-n}$ where R is an aliphatic or aromatic hydrocarbyl radical containing 1–12 carbon atoms; R' is a substituted or unsubstituted, saturated or unsaturated carboxylate radical ($R''CO_2-$) or oxy radical ($R'''O-$) or a mixture of such radicals, where $R''$ and $R'''$ are aliphatic, alicyclic, aromatic, aralkyl or heterocyclic radicals and $R''$ contains 1 to 36 carbon atoms and $R'''$ contains 6 to 25 carbon atoms with the proviso that $R'''$ is not identical with R; and n has the value 1 or 2.

Mixtures of the above-defined compounds in which $n=1$ and $n=2$ are also contemplated.

Preferably, the particulate material is treated with the aluminium derivative by dispersion of the particulate material in a solution of the aluminium reagent. The alkoxyaluminium derivatives $(RO)_2AlR'$ or $ROAlR'_2$ are adsorbed on the surface of the particulate material and then react with particulate surface hydroxyl groups M-OH to form a layer of chemically-bonded oxyaluminium derivatives

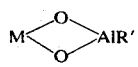

or $M-OALR'_2$. Adsorbed moisture present on the surface of the particulate material can also hydrolyse the aluminium alkoxide bonds, forming the intermediate species $(HO)_nAlR'_{3-n}'$, where n is 1 or 2, which can advantageously augment the chemically-bonded oxyaluminium derivation by co-reaction to form cross-linked oxyaluminium structures, e.g.

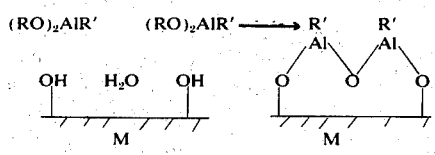

or may condense, to form an adsorbed layer of polymeric oxyaluminium derivatives, $(O AlR')_x$.

Aluminium soaps have been used in the past for surface treatment of particulate materials to impart oleophilicity. However, these soaps are usually formed by mixing a dispersion of the particulate in the sodium salt solution with an aluminium salt, thus precipitating the soap indiscriminately on whatever nuclei were present in the mixture. In the present system, the alkoxyaluminium derivatives are first adsorbed in an ordered micelle-like array, and then hydrolysed in situ by reaction with hydroxyl groups or adsorbed water molecules on the particulate surface. This allows a more uniform and effective oleophilic coating of individual particles. As the hydrolysis is rapid, but not instantaneous, the adsorbed alkoxy aluminium derivative also acts as a dispersant during mixing, and ensures that individual particles are coated. In contrast to this, the precipitation method produces a gel-coat on individual particles and agglomerates, as well as agglomerating a proportion of the particles, and forming separate gel particles in the mixture.

United States Patent No. 3,294,686 describes, for similar purposes, the use aluminium triacrylates and "oxy aluminium acylate polymers" where the acrylate moiety contains at least 6 carbon atoms. The latter are described also in United States Patent No. 2,979,497 and in both cases the oxyaluminium acylates are produced by the reaction between an aluminium alkoxide, a carboxylic acid and water in approximately 1:1:1 molar ratio. The resultant compounds are described as "oxy aluminium acylate polymers" and are usually cyclic trimers. This use of water has been accepted practice in the art. The method of the present invention is superior in that monomeric aluminium compounds are used and the hydyrolysis reaction is produced in situ on the particle surface by the surface hydroxyls, or surface moisture, resulting in much better absorption of the modifying coating on to the particle surface.

The surface modification produced by this invention gives improved results over prior art procedures, namely the following:

1. Improved dispersability in liquid and plastics systems.
2. Improved mechanical properties, as a consequence of improved dispersability, in plastics media.
3. Reinforcement of plastics composites when containing filler modified with alkoxy aluminium methacrylates or other reactive vinylic acrylates.
4. Reduced gel time of filled styrene-polyester composites, resulting from reduced adsorption and deactivation of catalysts by filler surfaces.

In general, the process may be carried out by preparing the aluminium compound in a suitable solvent and then dispersing the particulate material in this solution. The treated material is then separated.

The preparation of the aluminium compound may be carried out by known method, which consists of simply mixing the selected alkoxy aluminium compound with the appropriate carboxylic acid, or alcohol or phenol, or a mixture thereof. For each mole of alkoxy aluminium compounds, an amount of the other reagent between 1 and 2 moles is used, so as to give a compound in which n is 1 or 2 or a mixture of both.

The various alternative reactions involved are:

$(RO)_3Al + R''COOH \rightarrow (RO)_2Al\ OOCR'' + ROH$ $(RO)_3Al + 2R''COOH \rightarrow RO\ Al(OOCR'')_2 + 2ROH$ $(RO)_3Al + R'''OH \rightarrow (RO)_2Al\ OR''' + ROH$ $(RO)_3Al + 2R'''OH \rightarrow RO\ Al(OR''')_2 + 2ROH$ where $R, R''$ and $R'''$ are as defined above.

Usually the alkoxy aluminium compound is dissolved in a solvent such as an aliphatic or aromatic hydrocarbon or chlorinated hydrocarbon or mixture of these. The solvents should be anhydrous (except as mentioned below) and should not be compounds containing substituents which react with aluminium alkoxy compounds.

The acid, phenol or alcohol or mixture, is then added to the aluminium compound solution. If the acid, phenol or alcohol is liquid it may be added as such, but if it is a solid, it is preferable to dissolve it in solvent and add the solution to the aluminium reagent.

The reaction is quick, usually being complete in a few minutes and heat may be evolved. It is normally desirable to maintain the temperature between 10° and 30°C; high temperatures lead to undesirable side reactions, which result in loss of the acylate as the corresponding ester, polymerisation of the alkoxy aluminium derivatives and gellation of the reagent solution, e.g.

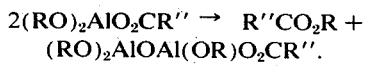

Similar reactions occur if the reagent solution is allowed to stand for too long and it is preferred to use the mixture within a half hour or so of its preparation.

In the preparation of the aluminium alkoxy compounds, the compound is formed in solution in the presence of by-product alcohol ROH. It has been proposed that the compound is, in these circumstances, in equilibrium with its solvated species, as shown:

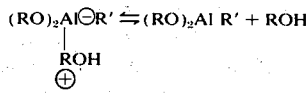

This invention is meant to encompass either species of this equilibrium.

The reaction of this solution with the particulate material is carried out by adding the material to the solution, preferably using a suitable high shear mixer to obtain adequate dispersion. The material should be added at the rate which will permit such dispersion. The reaction in this step is also rapid and it is usually only necessary to continue stirring for 5 minutes or so after the addition is complete.

The reaction with the particulate depends on hydrolysis of the alkoxy group(s) of the aluminium compounds by the hydroxyl groups at the surface of the material or by moisture adsorbed onto the surface. Most commercial inorganic or mineral materials have surface hydroxyl groups associated with lattice defects, or formed by hydrolysis during manufacture or natural weathering, even though hydroxy groups are not formally part of the crystal structure.

In cases where the material does not have sufficient of the appropriate hydroxyl groups, it is necessary that adsorbed water be present. This usually occurs adventitiously at a level adequate for the reaction required. Where this is not so, however, through special drying of the material or other reason, the material should be first treated with water to condition it, before using it in the reaction. In some cases, the water may even be added to the mixture after the addition of the particulate material. A level of 0.25 to 0.5 percent of water based on the weight of the material is often adequate for the reaction, although amounts outside this range may be suitable.

After the reaction is complete, the particulate material may be separated by conventional methods such as settling and decantation, filtration, centrifuging and the like. Normally the material is washed and dried, but it may also be used while still wet with the solvent if this is desired.

Satisfactory levels of aluminium compound which give advantageous properties are in the range of 0.1 to 10% by weight of the weight of particulate material. Particularly useful and economical materials are obtained where the level is about 1 to 5 percent.

The reagent aluminium alkoxides, $(RO)_3Al$, and the alkoxy moiety of the $(RO)_nAlR'_{3-n}$, contain as the radical R a hydrocarbyl radical containing 1 to 12 carbon atoms, and includes normal alkyl radicals such as ethyl, propyl or butyl, or preferably (in terms of commercial availability) branched-chain alkyl radicals such as isopropyl, sec. or tert. butyl. The radical R may also include aryl, alkaryl, and alicyclic radicals, substituted derivatives of these and of alkyl radicals, and also mixtures of radicals (equivalent to mixtures of aluminium alkoxides) particularly in examples where the by-product species ROH is advantageously retained by adsorption on the treated particulate.

The reagent R'H may consist of oxy species R'''OH, carboxylic acids R''CO$_2$H, or mixtures of these. The R' moiety of $(RO)_nAlR'_{3-n}$ accordingly may consist of R'''O or R''CO$_2$. The oxy species R''' may contain from 6 to 25 carbon atoms, the radical R''' including normal alkyls such as hexyl, octyl, dodecyl, branched chain radicals such as 2-ethylhexyl, 2-ethyloctyl, unsaturated radicals such as oleyl or linoleyl, alicyclic radicals such as cyclohexyl or terpenoid radicals, aromatic radicals such as phenyl, cresyl, naphthyl, and heterocyclic radicals, as well as mixtures of these, including those derived from natural sources such as tallow, soya, palm or castor oils, resins or waxes, or from petroleum, or synthetic origins. Also included are derivatives of these in which the radical R''' has substituent group or groups including saturated, unsaturated or aromatic hydrocarbyl or heterocyclic groups, halogen, hydroxy, keto, amino, amido, ether, ester, thio, sulphonyl, silyl or nitro groups.

The carboxylic acids R''CO$_2$H and the derived radicals R''CO$_2$ may contain from 1 to 36 carbon atoms, the radicals R'' including normal alkyls such as methyl (acetic acid), propyl (butyric acid), amyl (hexanoic acid) undecyl (lauric acid), mono and polyunsaturated radicals as in acrylic, methacrylic, crotonic,, sorbic, undecylenic, oleic or linoleic acids, branched chain alkyls as in 2-ethylhexanoic acid, 2-ethylbutyric acid, or 2-ethyloctanoic acid, aromatic, alicyclic or heterocyclic acids including benzoic acid and terpenoid acids. Also included are mixtures of these, including those derived from natural sources such as tallow, soya, linseed, palm or caster oils, resins or waxes, or from petroleum or synthetic origins. Also included are derivatives of these in which R'' has substituted group or groups including saturated, unsaturated, aromatic hydrocarbyl or heterocyclic groups, halogen, hydroxy, keto, amino, amido, ether, ester, thio, sulphonyl, nitro or silyl groups. Acid anhydrides may be used which undergo alcoholysis with the alkoxy aluminium compound to form the half ester, examples are phthalic anhydride and maleic anhydride.

Particulate materials which may be treated in accordance with the invention include finely divided powders and fibres insoluble in the treating solvent, and which may or may not formally bear surface hydroxy groups. Such hydroxyl groups are normally present on the surfaces of metals, metal and non-metallic oxides and oxide mixtures, carbonates, cyanides and sulphides, heavy-metal salts, carbon black or graphite, clay minerals including thermally-altered minerals, and particulate materials already surface-modified by coatings of inorganic oxides, mixed oxides or silicates. Also included are clay minerals such as natural, beneficiated, delaminated, or calcined kaolins, halloyside, vermiculite, mica, montmorilllonite, chlorites, illites, talc, asbestos, titania and various coated titania pigments, calcium carbonate, barium sulphate, silica and silicates, alumina and alumino-silicates, glass fibres, spheres and powders, iron oxides, zinc oxide, carbon black, graphite, molybdenum disulphide, magnesia, chromia and chromates, metal powders or whiskers, and other finely divided materials used for filling, extending, reinforcement, viscosity-modification, or pigmentation of surface coating, plastics, elastomeric, or oleaginous compositions.

In a further and specific aspect of the invention, a particulate pigment or filler is treated with an aluminium compound of the type described herein which contains a methacrylate radical or another reactive vinylic or acrylate radical. Pigments or fillers thus modified have a reinforcing action when incorporated into a solid polymeric matrix. This reinforcing action may be further enhanced by the incorporation of a suitable polymerisation initiator into a polymer/filler formulation.

The invention includes within its scope, particulate materials, especially pigments and fillers, when modified by the method of the invention, as well as paints and coatings and articles comprising such pigments or fillers.

The invention will be further illustrated by the following non-limiting examples.

EXAMPLE 1

Freshly redistilled aluminium isopropoxide (11.9 parts) was dissolved in 30 parts of dry hexane. Methacrylic acid (5.2 parts), diluted with 30 parts of hexane was added to the alkoxide solution and the mixture stirred at room temperature for 15 minutes. Half of the resultant dialkoxy-aluminium methacrylate solution was added to 1,000 parts of dry hexane contained in a squirrel-cage high-shear mixer, and 500 parts of kaolin ("Hydrite-10," supplied by the Georgia Kaolin Co.) previously dried at 50°C, was added to the solution with vigorous mixing over a period of 1 minute, after which the remainder of the alkoxy aluminium methacrylate solution was added and the mixing continued for an additional 5 minutes. The resultant dispersion was then dried by rotary evaporation under vacuum to remove the hexane and by-product isopropanol, and the dry, strongly hydrophobic, treated kaolin pulverised by light grinding. Finely-divided commercial aluminium isopropoxide, approximately $Al(OC_3H_7)_3$, may be used instead of the freshly redistilled material, and dichloroethane may replace part or all of the solvent hexane.

EXAMPLES 2 to 18

Using the method of Example 1, other finely divided fillers and pigments were similarly treated with diisopropoxyaluminium acrylate, methacrylate, 2-ethylbutyrate, hexoate, 2-ethylhexoate, laurate, oleate and sorbate. The compositions and properties of the treated products are summarised in the following table. Paraffin oil dispersions containing 30 percent of titania or calcite or 20 percent of the other particulates were prepared using a Sorval Omnimixer. Polyethylenes containing 20 percent or 40 percent W/W of the particulate materials were prepared by mixing high density polyethylene with the particulates in a Brabender Plastograph roller mixer at stock temperatures of 165°–190°C for 10 minutes, and the resultant compositions formed into sheets by pressing at 175°C for 5–10 minutes.

Where indicated in the table 0.01 percent W/W of 2,5-dimethyl-2,5-bis-t-butylperoxyhexane was added to the formulation to promote grafting between the polyethylene and the adsorbed methacrylate. Similar results could be obtained using dicumyl or di-t-butyl peroxide as graft initiators, and it is significant that substantial improvement in impact and tensile strength of the filled polyethylene could be achieved by incorporation of kaolin treated by Example 1 without added graft initiator.

The Table also includes values for several untreated particulate materials (marked #) which have been included for comparison.

| Example | Particulate | Acylate moiety $R''CO_2-$ | % ($RO_2$-Air'W/W Particulate) | Yield stress (dyne. $cm^{-2}$) of paraffin oil dispersion | Gel time (min) of styrene-polyester containing 20% of treated particulate | Tensile strength (Kg. $cm^{-2}$) of 20% filled polyethylene | Elongation of break (%) of 20% filled polyethylene | Impact strength (Kg. M.M.$^{-1}$) of 20% filled polyethylene |
|---|---|---|---|---|---|---|---|---|
| # | A | — | — | — | — | 289 | 1045 | 2.77 |
| # | B | untreated | 0 | >1000 | 770 | 284 | 218 | 1.38 |
|   | " | " |   |   |   | 281* | 13* | 0.65* |
| 1 | " | Methacrylate | 2.7 | 1.4 | 210 | 296 | 420 | 2.99 |
|   | " | " |   |   |   | 325* | 14* | 2.34.* |
|   | " | " |   |   |   | 301** | 430** | 3.04** |
|   |   |   |   |   |   | 318*** | 12*** | 2.76*** |
| 2 | " | Acrylate | 2.5 | — | — | 292 | 150 | 2.23 |
| 3 | " | Laurate | 3.6 | 1.6 | 185 | 266 | 16 | 1.73 |
| 4 | " | Oleate | 4.4 | 1.6 | — | 273 | 170 | 1.49 |
| 5 | " | Hexoate | 4.0 | 4.3 | — | 270 | 152 | 2.24 |
| 6 | " | 2-ethyl butyrate | 3.0 | 2.0 | — | 269 | 300 | 1.91 |
| 7 | " | 2-Ethyl hexoate | 3.2 | 1.2 | — | 268 | 206 | 1.52 |
| 8 | " | Sorbate | 2.8 | — | — | 287 | 192 | 1.68 |
| # | C | untreated | 0 | >1000 | — | 272 | 162 | 2.87 |
| 9 | " | Methacrylate | 2.7 | 14.1 | — | 284 | 390 | 3.37 |
| 10 | " | Laurate | 3.5 | 17.4 | — | — | — | — |
| # | D | untreated | 0 | 27.6 | — | 285 | 170 | 1.41 |
| 11 | " | Methacrylate | 2.5 | 2.1 | — | 276 | 390 | 1.88 |
| 12 | " | Laurate | 3.5 | <1.0 | — | 296 | 212 | 1.76 |
| # | E | untreated | 0 | 73.9 | — | 285 | 100 | 1.36 |
| 13 | " | Methacrylate | 2.7 | 6.1 | — | 301 | 158 | 2.58 |

— Continued

| Example | Particulate | Acylate moiety R"CO$_2$— | % (RO$_2$-Air'W/W Particulate | Yield stress (dyne. cm$^{-2}$) of paraffin oil dispersion | Gel time (min) of styrene-polyester containing 20% of treated particulate | Tensile strength (Kg. cm$^{-2}$) of 20% filled polyethylene | Elongation of break (%) of 20% filled polyethylene | Impact strength (Kg. M.M.$^{-1}$ of 20% filled polyethylene |
|---|---|---|---|---|---|---|---|---|
| 14 | " | Laurate | 3.5 | 1.8 | — | 269 | 140 | 1.37 |
| #15 | F | untreated | 0 | 120 | — | — | — | — |
|  | " | 2-Ethyl hexoate | 2.5 | 3.5 | — | — | — | — |
| #16 | G | untreated | 0 | 421 | — | — | — | — |
|  | " | 2-Ethyl hexoate | 2.5 | 4.4 | — | — | — | — |
| #17 | H | untreated | 0 | 4.85 | — | — | — | — |
|  | " | 2-Ethyl hexoate | 2.5 | 0 | — | — | — | — |
| #18 | J | untreated | 0 | 267 | — | — | — | — |
|  | " | 2-Ethyl hexoate | 2.5 | 2.4 | — | — | — | — |

A Unfilled polyethylene
B Kaolin ("Hydrite 10")
C Titania+
D Talc B.P.C.
E Delaminated kaolin
F Calcite
G Goethite
H Montmorillonite
J Halloysite
\* 40% filled polyethylene
\*\* + graft initiator
\*\*\* 40% filled polyethylene, + graft initiator
+ aluminosilicate-coated rutile

EXAMPLE 19

4.2 parts of β(ethoxythiocarbonylthio) propionic acid, prepared by the reaction between potassium ethyl xanthate and acrylic acid, was added to 4.4 parts of aluminium isopropoxide dissolved in 40 ml of methylene chloride. This solution was then applied to 250 parts of "Hydrite 10" kaolin in 400 parts of hexane, using the method of Example 1. The treated kaolin has a high affinity for free radicals, and for grafting with polyethylene. Polyethylene containing 20 percent w/w of the treated kaolin had a tensile strength of 305 Kg.cm$^{-2}$, elongation at break of 50 percent, and impact strength of 1.97 Kg.MM$^{-1}$.

EXAMPLE 20

7.2 parts of n-dodecanol dissolved in 25 parts of hexane was added to 7.8 parts of aluminium isopropoxide dissolved in 25 parts of hexane. The mixture was applied to 250 parts of Hydrite 10 kaolin by the method of Example 1.

Polyethylene containing 20 percent of the treated kaolin had impact strength of 1.48 Kg.MM$^{-1}$; paraffin oil containing 20% of the kaolin had a rheological yield stress of 6.2 dyne cm$^{-2}$. The treated kaolin, unlike the oxyaluminium acylate-treated kaolin, was not resistant to water and could be wetted, reflecting the hydrolytic instability of the aluminium dodecanoxide bond.

EXAMPLE 21

A 1:1 mixture of ispropoxy aluminium dimethacrylate and diisopropoxy aluminium methacrylate was prepared by the reaction of 7.2 parts of aluminium isopropoxide and 4.7 parts of methacrylic acid in a total of 50 parts of hexane. 300 parts of kaolin were dispersed in 1200 parts of water containing 1 part of sodium hexametaphosphate. The aluminium methacrylate solution was slowly added to the vigorously stirred kaolin dispersion which was then centrifuged and air-dried. Paraffin oil containing 20 percent of the treated kaolin showed a rheological yield stress of 20 dyne. cm$^{-2}$. Polyethylene containing 20 percent of the treated filler had an impact strength of 1.83 Kg.MM$^{-1}$, tensile strength of 278 Kg.cm$^{-2}$, and elongation at break of 135 percent. Whilst kaolin treated by this method showed inferior rheological and reinforcement properties compared to kaolin treated by the method of Example 1, i.e., in anhydrous media, it is superior to kaolin coated with precipitated pre-formed polymeric oxyaluminium methacrylate which showed with paraffin oil a rheological yield stress of 750 dyne.cm$^{-2}$, and formed a 20 percent composite with polyethylene having tensile strength of 282 Kg.cm$^{-2}$ and impact strength of 1.53 Kg.MM$^{-1}$. This latter treated kaolin was also only weakly hydrophobic. Poor hydrophobicity and rheology (yield stress in paraffin oil, 434 dyne.cm$^{-2}$) were also observed for kaolin coated with preformed polymeric oxyaluminium 2-ethylhexoate.

Those skilled in the art will appreciate that the invention described herein is susceptible to variations and modifications other than those specifically described. It is to be understood that the invention includes all such variations and modifications which fall within the spirit and scope of the appended claims.

I claim:

1. A method for the surface modification of particulate inorganic or mineral materials, which comprises treating the material with an organic aluminium derivative of the formula $(RO)_n AlR'_{3-n}$ where R is a radical selected from the group consisting of aliphatic or aromatic hydrocarbyl radicals containing 1–12 carbon atoms; R' is a radical selected from the group consisting of acrylate and methacrylate radicals $n$ has the value 1 or 2 and wherein said aluminium derivative is used as an amount of from 0.1 to 10 percent by weight of the material.

2. A method as claimed in claim 1, wherein the material is treated with a mixture of aluminium derivatives as defined in claim 1, in which $n = 1$ and $n = 2$.

3. A method as claimed in claim 1, wherein the material is treated by dispersion of the material in a solution of the aluminium derivative of derivatives.

4. A method as claimed in claim 3, wherein the aluminium derivative is dissolved in a solvent selected from the class of aliphatic and aromatic hydrocarbon solvents, chlorinated hydrocarbon solvents, and mixtures of any two or more of such solvents.

5. A method as claimed in claim 3, wherein the material is dispersed in the solution under conditions of high shear.

6. A method as claimed in claim 1, wherein water is added to the material before or after the said treatment.

7. A method as claimed in claim 1, wherein the said amount is from 1 to 5 percent by weight.

8. A method as claimed in claim 1, wherein the particulate material is a filler or pigment.

9. A particulate inorganic or mineral material having a modified surface consisting of a layer, chemically bonded to the surface, comprising at least one oxyaluminium derivative of a radical selected from the group consisting of acrylate and methacrylate radicals, $n$ has the value of 1 or 2; and wherein said aluminium derivative is used in an amount of from 0.1 to 10 percent by weight of the material.

10. A particulate inorganic or mineral material of claim 9 having a modified surface resulting from treatment in a substantially anhydrous organic solvent with an organic aluminium derivative of the formula $(RO)_n AlR'_{3-n}$ where R is a radical selected from the group consisting of aliphatic and aromatic hydrocarbyl radicals containing 1 to 12 carbon atoms; R' is a radical selected from the group consisting of acrylate and methacrylate radicals and $n$ has the value of 1 or 2.

11. A composition comprising polyethylene or styrene-polyester and as a filler the material claimed in claim 10.

12. A composition comprising polyethylene or styrene-polyester and as a filler the material claimed in claim 9.

13. A method as claimed in claim 1, wherein said organic aluminium derivative is prepared by dissolving a suitable aluminium alkoxy compound in an anhydrous organic solvent and reacting said alkoxy compound with a suitable acid, phenol, alcohol or mixtures thereof to provide said organic aluminium derivative.

14. A method as claimed in claim 13, wherein the temperature of the reaction of the alkoxy compound with the acid, phenol, alcohol or mixtures thereof is between 10° and 30°C.

15. A process as claimed in claim 13, wherein said material is treated with the organnic aluminium derivative within about one half hour of the preparation of said organic aluminium derivative.

16. A method as claimed in claim 1, wherein said treating is effected in a substantially anhydrous organic solvent.

17. A method as claimed in claim 6, wherein the water is added in a sufficient amount to provide a range of from 0.25 to 0.5 percent water based on the weight of the material.

* * * * *